(12) United States Patent
Yamanaka et al.

(10) Patent No.: US 9,917,536 B2
(45) Date of Patent: Mar. 13, 2018

(54) LINEAR ULTRASONIC MOTOR AND OPTICAL APPARATUS INCLUDING THE SAME

(71) Applicant: CANON KABUSHIKI KAISHA, Tokyo (JP)

(72) Inventors: Takumi Yamanaka, Tokyo (JP); Kazuhiro Noguchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 292 days.

(21) Appl. No.: 14/892,147

(22) PCT Filed: Jun. 6, 2014

(86) PCT No.: PCT/JP2014/003046
§ 371 (c)(1),
(2) Date: Nov. 18, 2015

(87) PCT Pub. No.: WO2014/196212
PCT Pub. Date: Dec. 11, 2014

(65) Prior Publication Data
US 2016/0111979 A1    Apr. 21, 2016

(30) Foreign Application Priority Data

Jun. 7, 2013   (JP) .................................. 2013-120737

(51) Int. Cl.
*H02N 2/10*   (2006.01)
*H02N 2/00*   (2006.01)
(Continued)

(52) U.S. Cl.
CPC .............. *H02N 2/103* (2013.01); *G02B 7/08* (2013.01); *H02N 2/0055* (2013.01); *H02N 2/026* (2013.01); *H02N 2/12* (2013.01)

(58) Field of Classification Search
CPC ...... H02N 2/103; H02N 2/0055; H02N 2/026; H02N 2/106; H02N 2/0045; H02N 2/004; G02B 7/08
(Continued)

(56) References Cited

U.S. PATENT DOCUMENTS

2005/0029875 A1* 2/2005 Sasaki .................... G02B 15/14
310/323.02
2006/0113868 A1* 6/2006 Sakatani ................. G02B 7/08
310/323.17
(Continued)

FOREIGN PATENT DOCUMENTS

CN         1580852 A    2/2005
CN       102017388 A    4/2011
(Continued)

OTHER PUBLICATIONS

PCT/IB/326 (PCT Notification Concerning Transmittal of International Preliminary Report on Patentability).
(Continued)

*Primary Examiner* — Shawki S Ismail
*Assistant Examiner* — Bryan Gordon
(74) *Attorney, Agent, or Firm* — Cowan, Liebowitz & Latman, P.C.

(57) ABSTRACT

A driving apparatus according to the present invention includes: a movable part including a vibrator including a piezoelectric element and a pressurization part for bringing the vibrator into pressure contact with a base part by applying impression force to the vibrator, the movable part being linearly driven; and a cover part for receiving reactive force of the impression force through intermediation of a rolling part, the cover part being fixed to the base part by a holding part extending in a direction crossing a movement direction of the movable part, in which the rolling part is
(Continued)

sandwiched by a guide part of the movable part extending in the movement direction of the movable part and a cover guide part of the cover part extending in the movement direction of the movable part, and the movable part is positioned on an outer side beyond a side of the holding part facing the movable part.

16 Claims, 4 Drawing Sheets

(51) Int. Cl.
    *H02N 2/02*          (2006.01)
    *G02B 7/08*          (2006.01)
    *H02N 2/12*          (2006.01)

(58) Field of Classification Search
    USPC ........................................ 310/323.14, 323.17
    See application file for complete search history.

(56) References Cited

U.S. PATENT DOCUMENTS

2010/0133955 A1*   6/2010   Sakamoto .............. H02N 2/026
                                                                                 310/323.02
2011/0037348 A1*   2/2011   Sakamoto ................ F16C 29/04
                                                                                 310/323.02
2012/0074813 A1*   3/2012   Takizawa ............. H02N 2/0055
                                                                                 310/323.17
2014/0293463 A1* 10/2014   Yamanaka ............ H02N 2/026
                                                                                       359/824

FOREIGN PATENT DOCUMENTS

| JP | H06-327275 | A | 11/1994 |
|----|------------|---|---------|
| JP | 2010-226940 | A | 10/2010 |
| JP | 2013-158165 | A | 8/2013 |

OTHER PUBLICATIONS

PCT/IB/373 (PCT International Preliminary Report on Patentability).
PCT/ISA/237 (PCT Written Opinion of the International Searching Authority).
PCT/IB/338 (Notification of Transmittal of Translation of the International Preliminary Report on Patentability).
The above references were cited in a Nov. 30, 2016 Chinese Office Action, which is enclosed with an English Translation, that issued in Chinese Application No. 201480020523.0.
The above documents were cited the International Search Report of PCT/JP2014/003046 Aug. 26, 2014.

* cited by examiner

LINEAR ULTRASONIC MOTOR AND OPTICAL APPARATUS INCLUDING THE SAME

CROSS-REFERENCE TO RELATED APPLICATIONS

This is a U.S. national stage of International Application No. PCT/JP2014/003046 filed on Jun. 6, 2014 the entire disclosures of which is hereby incorporated by reference.

TECHNICAL FIELD

The present invention relates to a driving apparatus, in particular, a linear-drive type ultrasonic motor (hereinafter referred to as "linear ultrasonic motor").

BACKGROUND ART

In a related-art linear ultrasonic motor, an ultrasonic vibrator having a piezoelectric element fixed thereto is vibrated by applying a high frequency voltage to the piezoelectric element. The vibration of the ultrasonic vibrator drives a sliding member impressed with the ultrasonic vibrator. The linear ultrasonic motor has been variously designed so as to keep a high output with a small size and to enhance drive efficiency.

For example, in a linear ultrasonic motor disclosed in PTL 1, an ultrasonic vibrator having a piezoelectric element is provided with two drivers which are held in abutment against a driven member and four rolling members between the driven member and a base member. The four rolling members are arranged at an interval so that the four rolling members cannot enter between the two drivers in the drive direction of the driven member.

CITATION LIST

Patent Literature

PTL 1: Japanese Patent Application Laid-Open No. 2010-226940

SUMMARY OF INVENTION

Technical Problem

However, in the linear ultrasonic motor disclosed in PTL 1, in order to maintain a configuration in which the four rolling members are arranged so that the four rolling members cannot enter between the two drivers in the drive direction of the driven member, it is necessary to set a long arrangement span of the rolling members in the drive direction of the driven member. As a result, there arises a problem in that the entire dimension of a unit in the drive direction becomes larger.

The present invention has been achieved to solve the above-mentioned problem, and it is an object of the present invention to provide a driving apparatus that eliminates the need to increase the entire dimension of a unit in a drive direction of a driven member without reducing an output, drive efficiency and a drive amount.

Solution to Problem

In order to solve the above-mentioned problem, a driving apparatus according to one embodiment of the present invention has the following configuration.

The driving apparatus includes: a movable part including a vibrator including a piezoelectric element and a pressurization part being configured to bring the vibrator into pressure contact with a base part by applying impression force to the vibrator, the movable part being linearly driven; and a cover part being configured to receive reactive force of the impression force through intermediation of a rolling part, the cover part being fixed to the base part by a holding part extending in a direction crossing a movement direction of the movable part, in which the rolling part is sandwiched by a guide part of the movable part extending in the movement direction of the movable part and a cover guide part of the cover part extending in the movement direction of the movable part, and the movable part is positioned on an outer side beyond a side of the holding part facing the movable part.

Further, a movable part of a driving apparatus according to one embodiment of the present invention has the following configuration.

The movable part of a driving apparatus is disposed between a base part and a cover plate fixed to the base part and is linearly driven with a rolling part interposed between the movable part and the cover plate. The movable part includes: a vibrator including a piezoelectric element; a pressurization part being configured to bring the vibrator into pressurized contact with the base part by applying impression force to the vibrator; and a guide part being configured to accommodate the rolling part, in which the guide part includes three guide parts and the three guide parts are arranged so as to form a triangle by connecting each other the three guide parts by a straight line, and the movable part is linearly driven so that an impression center of the pressurization part is positioned in the triangle formed by connecting each other the rolling parts accommodated in the three guide parts by the straight line.

Advantageous Effects of Invention

According to one embodiment of the present invention, the compact driving apparatus can be obtained, which eliminates the need to increase the entire dimension of the unit in the drive direction of the driven member without reducing the output, the drive efficiency, and the drive amount.

DESCRIPTION OF EMBODIMENT

Figure 1:
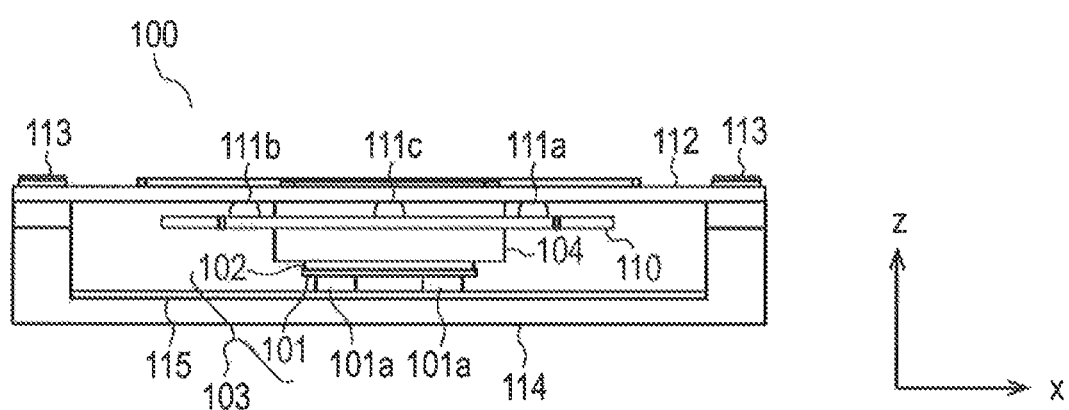
FIG. 1 is a side view of a linear ultrasonic motor according to the present invention.

An exemplary embodiment of the present invention is hereinafter described in detail with reference to the drawings. Note that, in the following description, a linear ultrasonic motor formed into a unit as an actuator for driving a lens barrel of a digital camera or the like is exemplified. However, the use of the present invention is not limited thereto.

Further, in this specification, in order to clarify the structure of the linear ultrasonic motor and the movement thereof, the same members are denoted by the same reference symbols in the drawings, respectively. Further, the movement direction of a movable part described later with respect to a base part is defined as an X-axis, and the normal direction of a contact part of a vibration plate included in the movable part is defined as a Z-axis. Further, the direction perpendicular to the X-axis and the Z-axis is defined as a Y-axis. The directions of the axes in each figure are as illustrated in the drawings but are not limited thereto.

FIG. 1 is a side view of a linear ultrasonic motor according to one embodiment of the present invention when viewed from a Y-axis direction.

Figure 2:
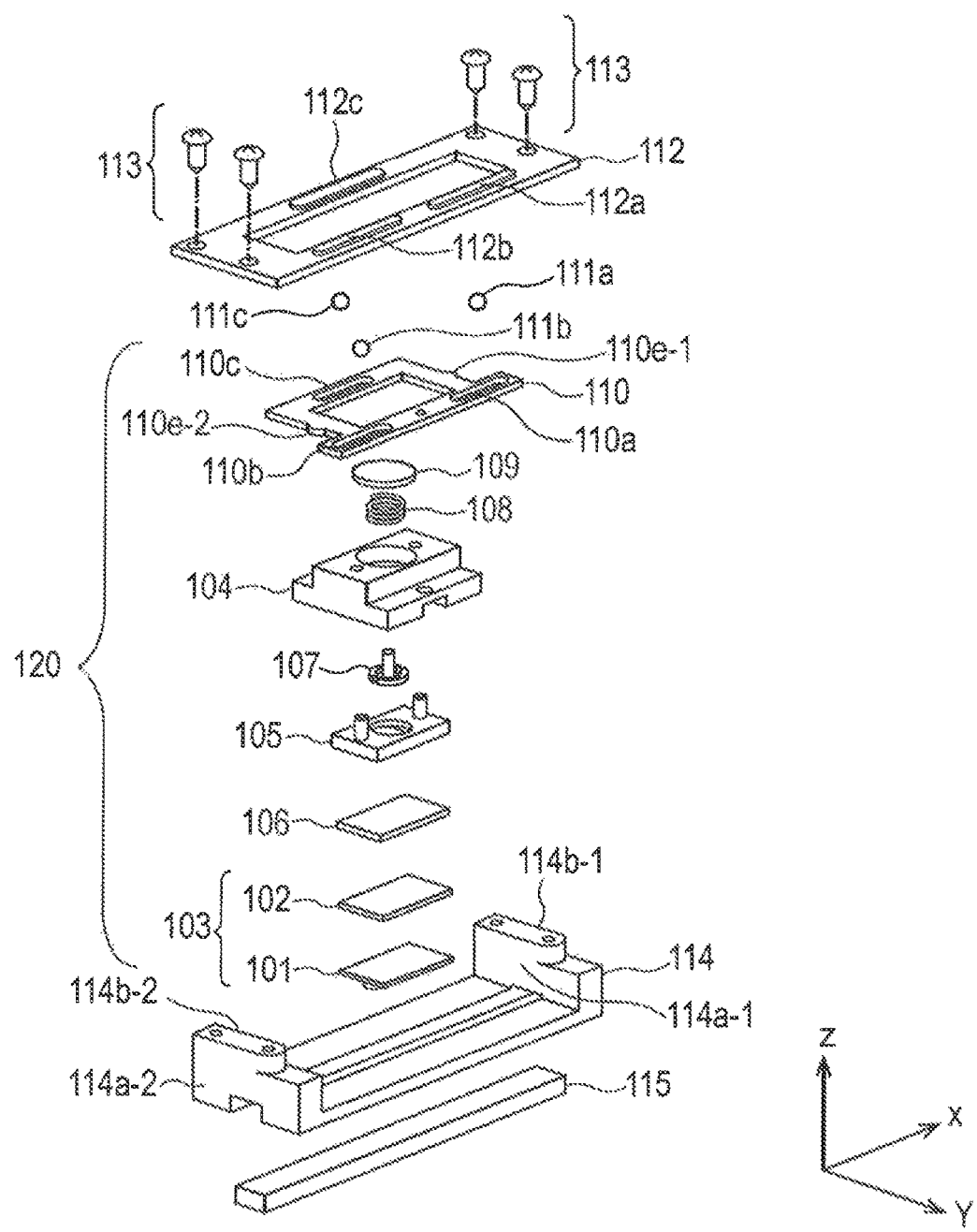
FIG. 2 is an exploded perspective view of the linear ultrasonic motor according to the present invention.

Further, FIG. 2 is an exploded perspective view of the linear ultrasonic motor illustrated in FIG. 1.

A linear ultrasonic motor 100 as a driving apparatus according to this embodiment has a major axis in an X-axis direction and is formed of members described below. A vibration plate 101 has a piezoelectric element 102 fixed thereto by using a known adhesive or the like, and the piezoelectric element 102 excites ultrasonic vibration by being supplied with a voltage. Note that, there is no limit to the method of bonding the vibration plate 101 and the piezoelectric element 102 as long as the vibration plate 101 and the piezoelectric element 102 are bonded to each other. The vibration plate 101 further includes a contact part 101a, and the contact part 101a is held in contact with a contact base member 115 described later in a pressurized contact state involving impression. A vibrator 103 is formed of the vibration plate 101 and the piezoelectric element 102. When the piezoelectric element 102 generates ultrasonic vibration while the vibration plate 101 and the piezoelectric element 102 are bonded to each other, a resonance phenomenon occurs in the vibrator 103. As a result, ellipsoidal motion occurs in the contact part 101a of the vibration plate 101. The desired movement can be obtained by changing the frequency and phase of the voltage to be applied to the piezoelectric element 102, to thereby appropriately change the rotation direction and elliptic ratio of the ellipsoidal motion.

A vibrator support member 104 has a protrusion cross section in a YZ-plane and includes a through-hole for receiving a spring 108 and a spring holding member 107. The spring holding member 107 has a surface for receiving and holding one end of the spring 108 and is held in surface contact with a pressurization plate 105 on a reverse side of the surface. The other end of the spring is held in contact with a spring presser plate 109, and the spring presser plate 109 can be fitted in the through-hole of the vibrator support member 104. In the through-hole, the spring 108 is held by the spring holding member 107 and sandwiched between the pressurization plate 105 and the spring presser plate 109. Consequently, the spring 108 can freely expand or contract and applies impressing force in a Z-axis direction. Further, the pressurization plate 105 has two projection parts on a surface for receiving the holding member 107 in a direction parallel to a normal line of the surface. The two projection parts are respectively received by holes formed in the vibrator support member 104. This structure restricts the movement of the spring 108 in directions other than the Z-axis direction during expansion or contraction of the spring 108, and the impressing force is efficiently transmitted to other members. In this embodiment, the pressurization plate 105, the spring holding member 107, the spring 108 and the spring presser plate 109 form a pressurization part, and the centers of gravity of the respective constituent elements can be connected by a straight line parallel to the Z-axis.

An elastic member 106 is disposed between the piezoelectric element 102 and the pressurization plate 105. The elastic member 106 prevents direct contact between the pressurization part and the piezoelectric element 102 to prevent damages to the piezoelectric element.

A movable plate 110 includes a substantially rectangular fitting hole and three guide parts 110a, 110b, 110c each having a groove which is V-shaped in cross section (hereinafter referred to as "V-groove"), and a protruding portion of the vibrator support member 104 is fitted in the fitting hole of the movable plate 110. The V-groove guide parts 110a, 110b, 110c have a predetermined length in the X-axis direction, and spherical rolling members 111a, 111b, 111c serving as rolling parts are put in the respective guide parts 110a, 110b, 110c.

On the other hand, a cover plate 112 serving as a cover part also includes a substantially rectangular fitting hole and three V-groove cover guide parts 112a, 112b, 112c having a predetermined length in the X-axis direction, and the protruding portion of the vibrator support member 104 is fitted in the fitting hole. The V-groove cover guide parts 112a, 112b, 112c and the V-groove guide parts 110a, 110b, 110c are respectively formed at positions opposed to each other. The rolling members 111a, 111b, 111c are also sandwiched by and accommodated in the V-groove cover guide parts 112a, 112b, 112c, and the vibrator support member 104 and the movable plate 110 can move relative to the cover plate 112 in the X-axis direction without rattling.

The linear ultrasonic motor 100 further includes a bottom member 114. The bottom member 114 has a recessed shape in cross section in an XZ-plane and includes side walls 114a-1, 114a-2 and holding parts 114b-1, 114b-2 formed of a part of the side walls 114a-1, 114a-2 in a direction crossing the X-axis direction at both ends of the X-axis direction. The holding parts 114b-1, 114b-2 have screw holes in top portions thereof, and the screw holes are opposed to respective screw holes of the cover plate 112. The cover plate and the bottom member 114 are fixed to each other by screws 113, and there is no limit to the fixing method as long as the cover plate and the bottom member 114 are fixed to each other. Further, the contact base member 115 is fixed to a bottom surface side of the bottom member 114 by screws or the like (not shown) from a lower side of the Z-axis. The contact base member 115 is held in contact with the contact part 101a of the vibration plate 101, and the ellipsoidal motion occurring in the vibrator 103 due to the friction between the contact base member 115 and the contact part 101a is used as drive force of a movable part 120. The movable part 120 can move forward and backward by being linearly driven in the X-axis direction by the drive force. Note that, there is no limit to the fixing method as long as the bottom member 114 and the contact base member 115 are fixed to each other. In this embodiment, the vibrator 103, the elastic member 106, the pressurization plate 105, the vibrator support member 104, the spring holding member 107, the spring 108, the spring presser plate 109 and the movable plate 110 form the movable part 120. Further, the cover plate 112, the screws 113, the bottom member 114 and the contact base member 115 form a base part.

Hereinafter, the impressing force generated in the pressurization part is described. The spring 108 applies impressing force to the pressurization plate 105 through the intermediation of the spring holding member 107. The impressing force further becomes bias force for impressing the vibrator 103 to the contact base member 115 through the intermediation of the elastic member 106. Then, the contact part 101a of the vibration plate 101 is brought into contact with the contact base member 115 in an impressed state. On the other hand, the reactive force of the impressing force from the contact base member 115 is received by the cover plate 112 through the intermediation of the movable part and the rolling members. If a voltage is applied to the piezoelectric element 102 when the pressurized contact state is established, the ellipsoidal motion caused by each resonance in the X-axis direction and the Y-axis direction occurring in the vibrator 103 is efficiently transmitted to the contact base member 115. As a result, the movable part 120 can move forward and backward in the X-axis direction.

The members described above are incorporated and formed into a unit as the linear ultrasonic motor.

Hereinafter, the configuration of the relative movement of the movable part 120 with respect to the base part is described with reference to FIGS. 3A, 3B and 3C.

Figure 3A:
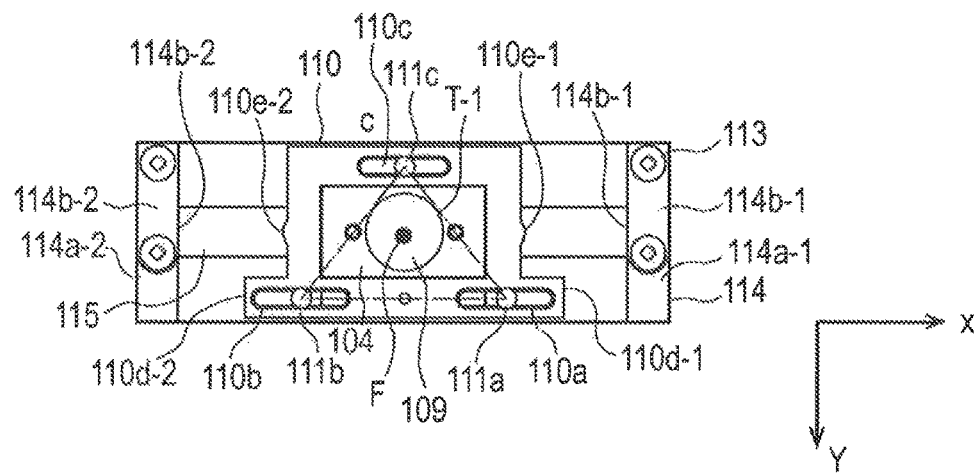
FIG. 3A is a front view of a linear ultrasonic motor unit according to the present invention in the case where a movable part is disposed at an intermediate position.
Figure 3B:
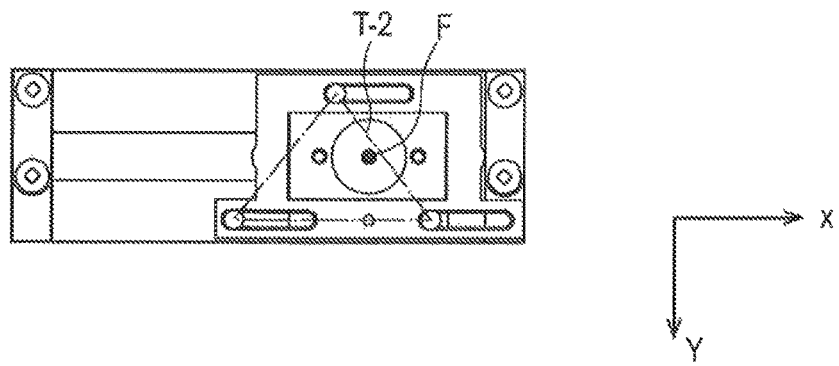
FIG. 3B is a front view of the linear ultrasonic motor unit according to the present invention in the case where the movable part is disposed at a positive side mechanical end.
Figure 3C:
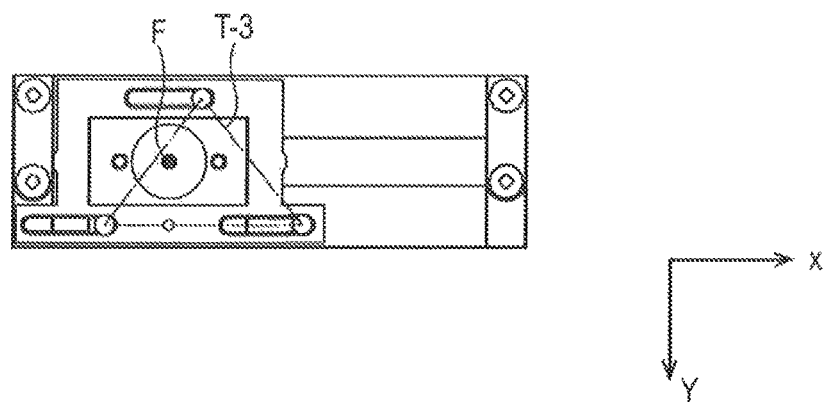
FIG. 3C is a front view of the linear ultrasonic motor unit according to the present invention in the case where the movable part is disposed at a negative side mechanical end.

FIGS. 3A, 3B and 3C are front views of the linear ultrasonic motor unit illustrated in FIG. 1 when viewed from the Z-axis direction. Note that, the cover plate 112 is omitted for ease of description. Further, in the following, an impression center F refers to a point matched with the center of gravity of the spring presser plate 109, and the centers of gravity of the respective members of the pressurization part can be connected to each other by a straight line parallel to the Z-axis. Thus, the impression center F is matched with a power point of the impression force by the spring 108 in the case where the impression force is concentrated at one point.

As is understood from the figures, the movable plate 110 of the movable part 120 of the linear ultrasonic motor has a protrusion shape when viewed from the Z-axis direction, and the width of the movable plate 110 in the Y-axis direction is substantially equal to the width of the bottom member 114 of the base part in the Y-axis direction. In a projection on an XY-plane, a crossing point of diagonal lines of the substantially rectangular hole of the movable plate 110 in which the protruding portion of the vibrator support member 104 is fitted is matched with the impression center. Projection parts 110d-1, 110d-2 at both ends in the X-axis direction of the movable plate 110 are provided with the guide parts 110a, 110b having a predetermined length and a predetermined width on the same straight line parallel to the X-axis. On the other hand, the guide part 110c having the same dimension as that of the guide parts 110a, 110b is also provided on a straight line parallel to the X-axis on a side opposite to the projection parts 110d-1, 110d-2 in the Y-axis direction with respect to the impression center F. The guide part 110c is formed so that the center in a longitudinal direction thereof is positioned on a straight line passing through the impression center F and being parallel to the Y-axis.

The bottom member 114 of the base part is provided with the side walls 114a-1, 114a-2 serving as wall parts which are opposed to each other in the X-axis direction and which have a level difference in the Z-axis direction. The length in the Y-axis direction of the holding parts 114b-1 and 114b-2 projecting in the Z-axis direction of the side walls 114a-1, 114a-2 is smaller than the width in the Y-axis direction of the bottom member 114. With this structure, the movement of the projection parts 110d-1, 110d-2 extending in the X-axis direction of the movable plate 110 is not prevented when the movable part 120 moves, which is described below in detail.

FIG. 3A illustrates a state in which the movable part 120 is disposed at an intermediate position in a movable range on the base part. In this case, the rolling members 111a, 111b, 111c are positioned in the middle of the X-axis direction, that is, the longitudinal direction of the respective guide parts 110a, 110b, 110c. Then, in the projection on the XY-plane, the impression center F is present in a triangle T-1 formed by connecting the centers of the rolling members 111a, 111b, 111c. Consequently, in the case where the movable part 120 is positioned at the intermediate point, the reactive force caused by the impression is stably supported by the three rolling members 111a, 111b, 111c.

FIG. 3B illustrates a state in which the movable part 120 is positioned at a positive side mechanical end which is a margin in the movable range on the X-axis positive side with respect to the intermediate position. The movable plate 110 includes a stop projection part 110e-1 which is initially brought into abutment against the side wall 114a-1 on the X-axis positive side. Therefore, in the case where the movable part 120 is driven in the X-axis positive direction from the intermediate position, the stop projection part 110e-1 and an inner side of the side wall 114a-1 of the bottom member 114 are brought into abutment against each other, with the result that the mechanical end of the movable part 120 is defined. In this case, the projection part 110d-1 of the movable plate 110 can move to the level difference portion of the side wall 114a-1 of the bottom member 114. Further, the V-groove guide part 110a of the movable plate 110 extends to the projection part 110d-2, and hence extends outward in the X-axis positive direction further than the inner side of the side wall 114a-1 of the bottom member 114. Thus, the movable amount in the X-axis positive direction of the movable part 120 with respect to the bottom member 114 is ensured. Also at the positive side mechanical end, in the projection on the XY-plane, the impression center F is designed to be present in a triangle T-2 formed by connecting the centers of the rolling members 111a, 111b, 111c interposed between the movable part 120 and the cover plate 112, that is, a triangle formed by connecting each rolling member by a straight line. Thus, even in the case where the movable part 120 is positioned at the positive side mechanical end, the reactive force caused by the impression is stably supported by the three rolling members 111a, 111b, 111c. Note that, FIG. 3B illustrates the case in which the stop projection part 110e-1 and the inner side of the side wall 114a-1 are brought into abutment against each other to define a movable end of the movable part 120. However, the present invention is not limited thereto, and the movement range of the movable part 120 may be defined through use of a controller (not shown) in the movable range of the movable part 120. For example, the movable part 120 may be controlled by the controller so as to stop at a control end before the stop projection part 110e-1 of the movable part 120 is brought into abutment against the side wall 114a-1 of the bottom member 114. Even in this case, the V-groove guide part 110a extends in the X-axis positive direction further than the inner side of the side wall 114a-1, and thus the movement amount in the positive direction of the movable part 120 can be ensured. Further, the impression center F is similarly present in the triangle formed by connecting the centers of the rolling members 111a, 111b, 111c.

FIG. 3C illustrates a state in which the movable part 120 is positioned at a negative side mechanical end which is a margin in the movable range on the X-axis negative side with respect to the intermediate position. The movable plate 110 includes a stop projection part 110e-2 which is initially brought into abutment against the side wall 114a-2 on the X-axis negative side. Therefore, in the case where the movable part 120 is driven in the X-axis negative direction from the intermediate position, the stop projection part 110e-2 and an inner side of the side wall 114a-2 of the bottom member 114 are brought into abutment against each other, with the result that the mechanical end of the movable part 120 is defined. In this case, similarly to the case illustrated in FIG. 3B, the projection part 110d-2 of the movable plate 110 can move to the level difference portion of the side wall 114a-2 of the bottom member 114. Further, the V-groove guide part 110b of the movable plate 110 extends outward in the X-axis negative direction further than the inner side of the side wall 114a-2 of the bottom member 114. Thus, the movable amount in the X-axis negative direction of the movable part 120 with respect to the bottom member 114 is ensured. Also at the negative side mechanical end, in the projection on the XY-plane, the impression center F is present in a triangle T-3 formed by connecting the centers of the rolling members 111a, 111b, 111c interposed between the movable part 120 and the cover plate 112, that is, a triangle formed by connecting each rolling member by a straight line. In this manner, even in the case where the movable part 120 is positioned at the negative side mechanical end, the reactive force caused by the impression is stably supported by the three rolling members 111a, 111b, 111c. Note that, FIG. 3C illustrates the case in which the stop projection part 110e-2 and the inner side of the side wall 114a-2 are brought into abutment against each other to define a movable end of the movable part 120. However, the present invention is not limited thereto, and the movement range of the movable part 120 may be defined through use of a controller (not shown) in the movable range of the movable part 120. For example, the movable part 120 may be controlled by the controller so as to stop at a control end before the stop projection part 110e-1 of the movable part 120 is brought into abutment against the side wall 114a-1 of the bottom member 114. Even in this case, the V-groove guide part 110b extends in the X-axis negative direction further than the inner side of the side wall 114a-2, and thus the movement amount in the negative direction of the movable part 120 can be ensured. Further, the impression center F is similarly present in the triangle formed by connecting the centers of the rolling members 111a, 111b, 111c.

As described above, the impression center is always present in the triangle formed by connecting each guide part of the movable part by a straight line.

Note that, in this embodiment, the V-groove guide part of the movable plate 110 extends further than the inner side of the side wall of the bottom member 114 at each position of the positive side mechanical end and the negative side mechanical end. However, the V-groove guide part of the movable plate 110 may extend further than the inner side of the side wall of the bottom member 114 at only one of the positive side mechanical end and the negative side mechanical end in accordance with the constraint in the X-axis direction when a unit is configured.

As described above, according to this embodiment, the compact linear ultrasonic motor as a driving apparatus can be obtained, which eliminates the need to increase the entire dimension of the unit in the drive direction of the driven member without reducing the output, the drive efficiency, and the drive amount.

Figure 4:
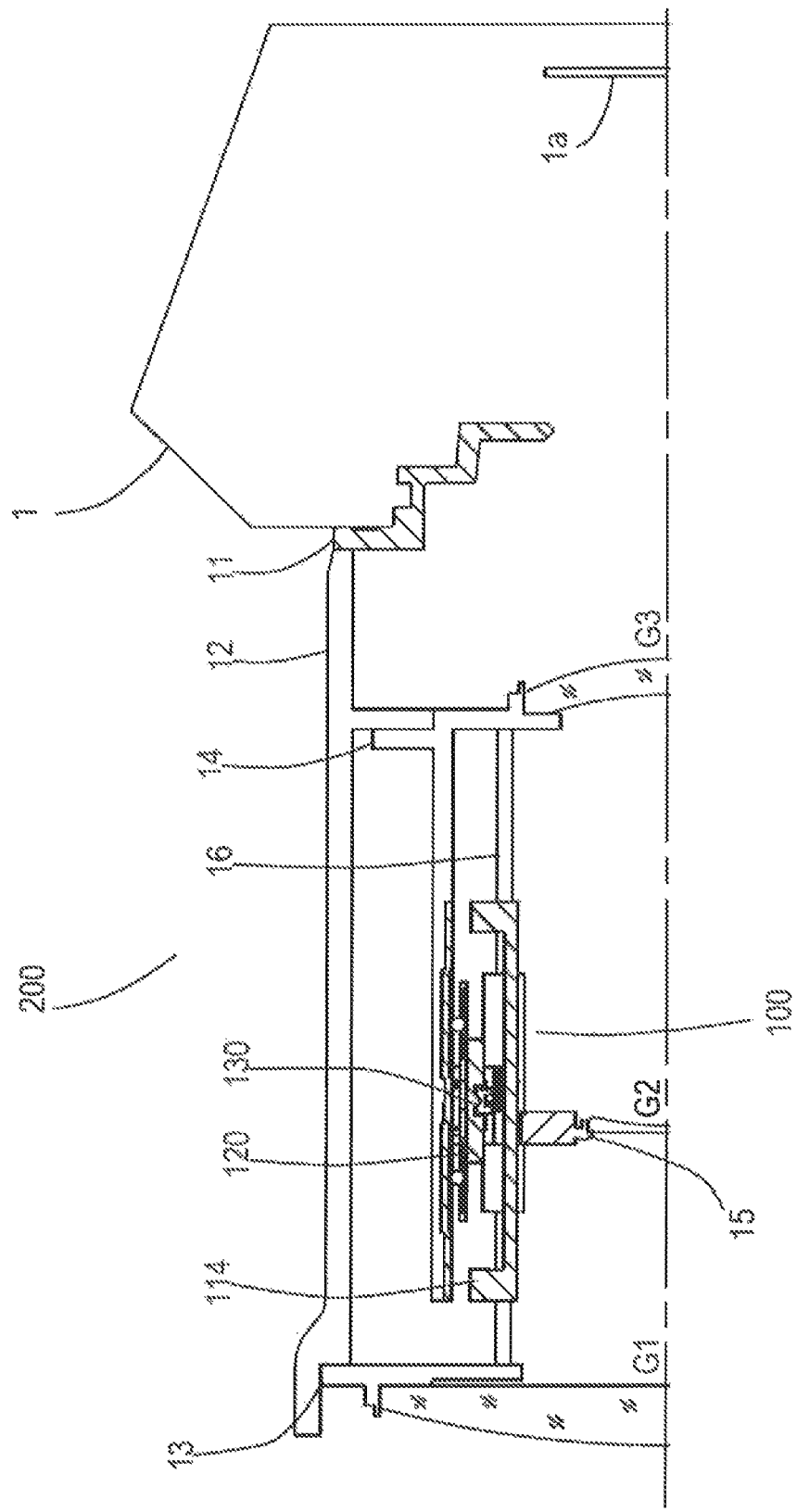
FIG. 4 is a sectional view of a lens barrel on which the linear ultrasonic motor according to the present invention is mounted.

FIG. 4 illustrates a lens barrel as an example of a lens device in which the linear ultrasonic motor 100 of the present invention is incorporated as a unit.

Note that, the lens barrel has substantially rotation symmetry and hence only an upper side half of the lens barrel is illustrated.

A lens barrel 200 is removably mounted on a camera body 1 serving as an image pickup apparatus, and an image pickup element 1a is provided in the camera body 1.

A mount 11 of the camera body 1 has a bayonet part for mounting the lens barrel 200 on the camera body 1. The lens barrel 200 includes a fixed barrel 12 which is held in abutment against a flange part of the mount 11. The fixed barrel 12 and the mount 11 are fixed with a screw (not shown). A front lens barrel 13 for holding a lens G1 and a back lens barrel 14 for holding a lens G3 are further fixed to the fixed barrel 12.

The lens barrel 200 further includes a focus lens holding frame 15 which holds a focus lens G2. The focus lens holding frame 15 is further held in a straightly movable manner by a known guide bar 16 held by the front lens barrel 13 and the back lens barrel 14.

A flange part (not shown) is formed at the bottom member 114 of the ultrasonic motor unit 100 and is fixed to the back lens barrel 14 with a screw or the like.

When the movable part 120 of the ultrasonic motor 100 is driven with the above-mentioned configuration, the drive force thereof is transmitted to the focus lens holding frame 15 through the intermediation of a drive force transmitting part 130. The focus lens holding frame 15 is linearly moved by the guide bar 16.

The specific embodiment of the linear ultrasonic motor according as a driving apparatus to the present invention has been described above in detail. However, the present invention is not limited to the above-mentioned embodiment, and can take any form without departing from the scope of the claims.

This application claims the benefit of priority from Japanese Patent Application No. 2013-120737, filed on Jun. 7, 2013, the content of which is incorporated herein by reference.

REFERENCE SIGNS LIST 102 piezoelectric element
103 vibrator
108 spring
110a, 110b, 110c guide part
111a, 111b, 111c rolling member
112 cover plate
112a, 112b, 112c cover guide part
114 bottom member
114a-1, 114a-2 side wall
115 contact base member
200 lens barrel
F impression center

The invention claimed is:
1. A driving apparatus, comprising:
a movable part comprising a vibrator including a piezoelectric element and a pressurization part being configured to bring the vibrator into pressure contact with a base part by applying impression force to the vibrator, the movable part being linearly driven; and
a cover part being configured to receive reactive force of the impression force through intermediation of a rolling part, the cover part being fixed to the base part by a holding part extending in a direction crossing a movement direction of the movable part, wherein the rolling part is sandwiched by a guide part of the movable part extending in the movement direction of the movable part and a cover guide part of the cover part extending in the movement direction of the movable part, and wherein the guide part of the movable part is positioned on an outer side beyond a side of the holding part facing the movable part when the movable part is positioned at at least one movable end.

2. A driving apparatus according to claim 1, wherein the guide part of the movable part comprises three guide parts, and the three guide parts are arranged so as to form a triangle by connecting each other the three guide parts by a straight line.

3. A driving apparatus according to claim 2, wherein the movable part is linearly driven so that an impression center of the pressurization part is positioned in the triangle formed by connecting the rolling parts accommodated in the three guide parts of the movable part by the straight line.

4. A driving apparatus according to claim 1,
wherein the holding part comprises a wall part formed on the base part, and
wherein when the movable part is positioned at at least one movable end, the guide part of the movable part is positioned on an outer side beyond an inner side of the wall part of the holding part.

5. A driving apparatus according to claim 1, wherein the linear drive of the movable part is controlled by a controller so that the movable part stops to define the movable end before being brought into abutment against the holding part.

6. A driving apparatus according to claim 1, wherein when at least a part of the movable part is brought into abutment against the holding part, the movable end is defined.

7. A driving apparatus according to claim 4, wherein when at least a part of the movable part is brought into abutment against the wall part, the movable end is defined.

8. A driving apparatus according to claim 1, is a linear ultrasonic motor which the piezoelectric element excites an ultrasonic vibration.

9. A lens device comprising a driving apparatus, said driving apparatus including:
a movable part comprising a vibrator including a piezoelectric element and a pressurization part being configured to bring the vibrator into pressure contact with a base part by applying impression force to the vibrator, the movable part being linearly driven; and
a cover part being configured to receive reactive force of the impression force through intermediation of a rolling part, the cover part being fixed to the base part by a holding part extending in a direction crossing a movement direction of the movable part,
wherein the rolling part is sandwiched by a guide part of the movable part extending in the movement direction of the movable part and a cover guide part of the cover part extending in the movement direction of the movable part, and
wherein the guide part of the movable part is positioned on an outer side beyond a side of the holding part facing the movable part when the movable part is positioned at at least one movable end.

10. An image pickup apparatus, comprising the lens device according to claim 9.

11. A movable part of a driving apparatus, which is disposed between a base part and a cover part fixed to the base part and which is linearly driven with a rolling part interposed between the movable part and the cover part, the movable part comprising:
a vibrator including a piezoelectric element;
a pressurization part being configured to bring the vibrator into pressurized contact with the base part by applying impression force to the vibrator; and
a guide part being configured to accommodate the rolling part,
wherein the guide part comprises three guide parts, and the three guide parts are arranged so as to form a triangle by connecting each other the three guide parts by a straight line, and
wherein the movable part is linearly driven so that an impression center of the pressurization part is positioned in the triangle formed by connecting each other the rolling parts accommodated in the three guide parts by the straight line.

12. A movable part of a driving apparatus according to claim 11,
wherein the base part comprises a holding part, and the holding part extends in a direction crossing a movement direction of the movable part to fix the cover part, and
wherein when the movable part is positioned at at least one movable end, the guide part is positioned on an outer side beyond a side of the holding part facing the movable part.

13. A movable part of a driving apparatus according to claim 12, wherein the linear drive of the movable part is controlled by a controller so that the movable part stops to define the movable end before being brought into abutment against the holding part.

14. A movable part of a driving apparatus according to claim 12, wherein when at least a part of the movable part is brought into abutment against the holding part, the movable end is defined.

15. A movable part of a driving apparatus according to claim 12,
wherein the holding part comprises a wall part formed on a base part, and
wherein when at least a part of the movable part is brought into abutment against the wall part, the movable end is defined.

16. A movable part of a driving apparatus according to claim 11, wherein the driving apparatus is a linear ultrasonic motor which the piezoelectric element excites an ultrasonic vibration.

* * * * *